Patented Mar. 11, 1930

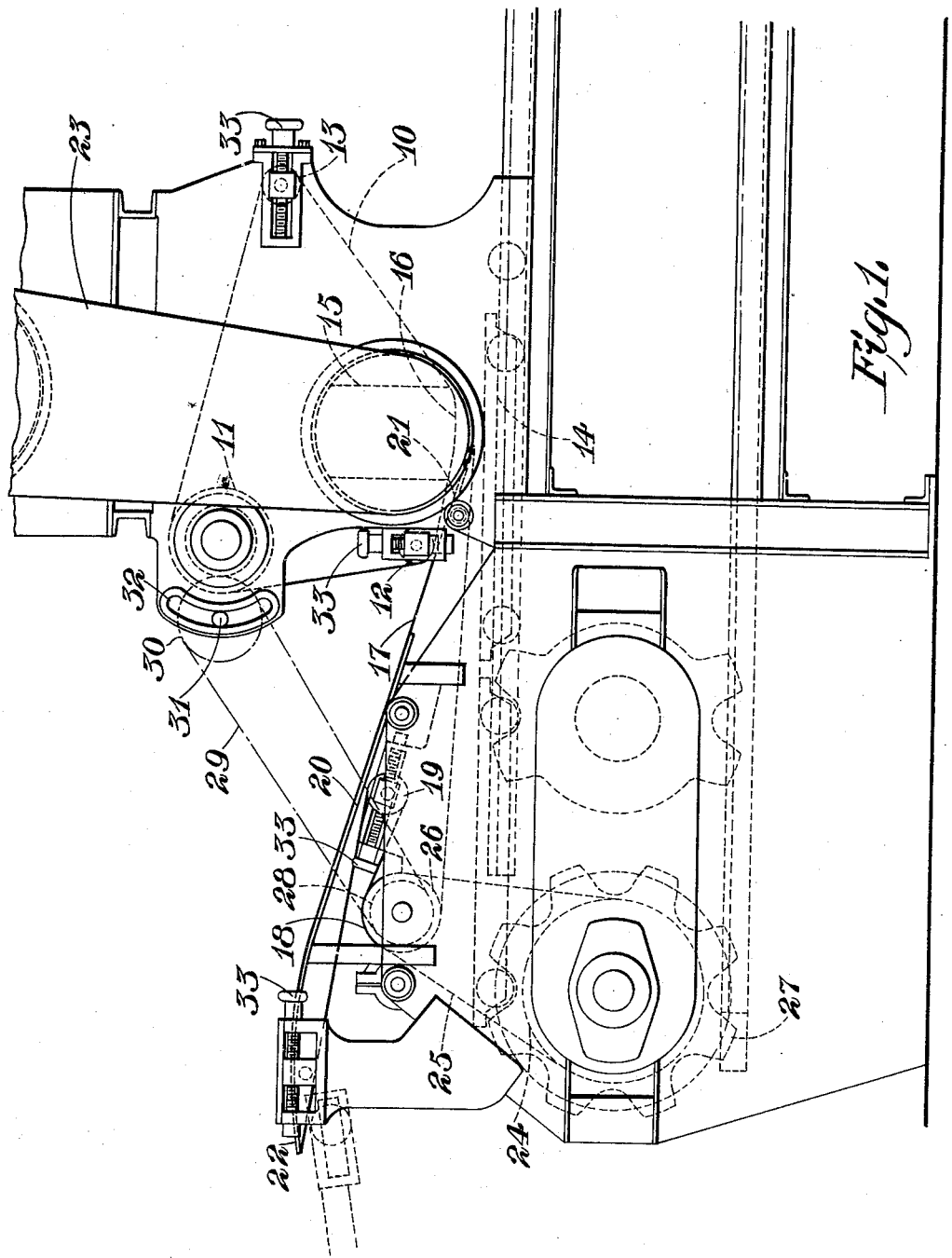

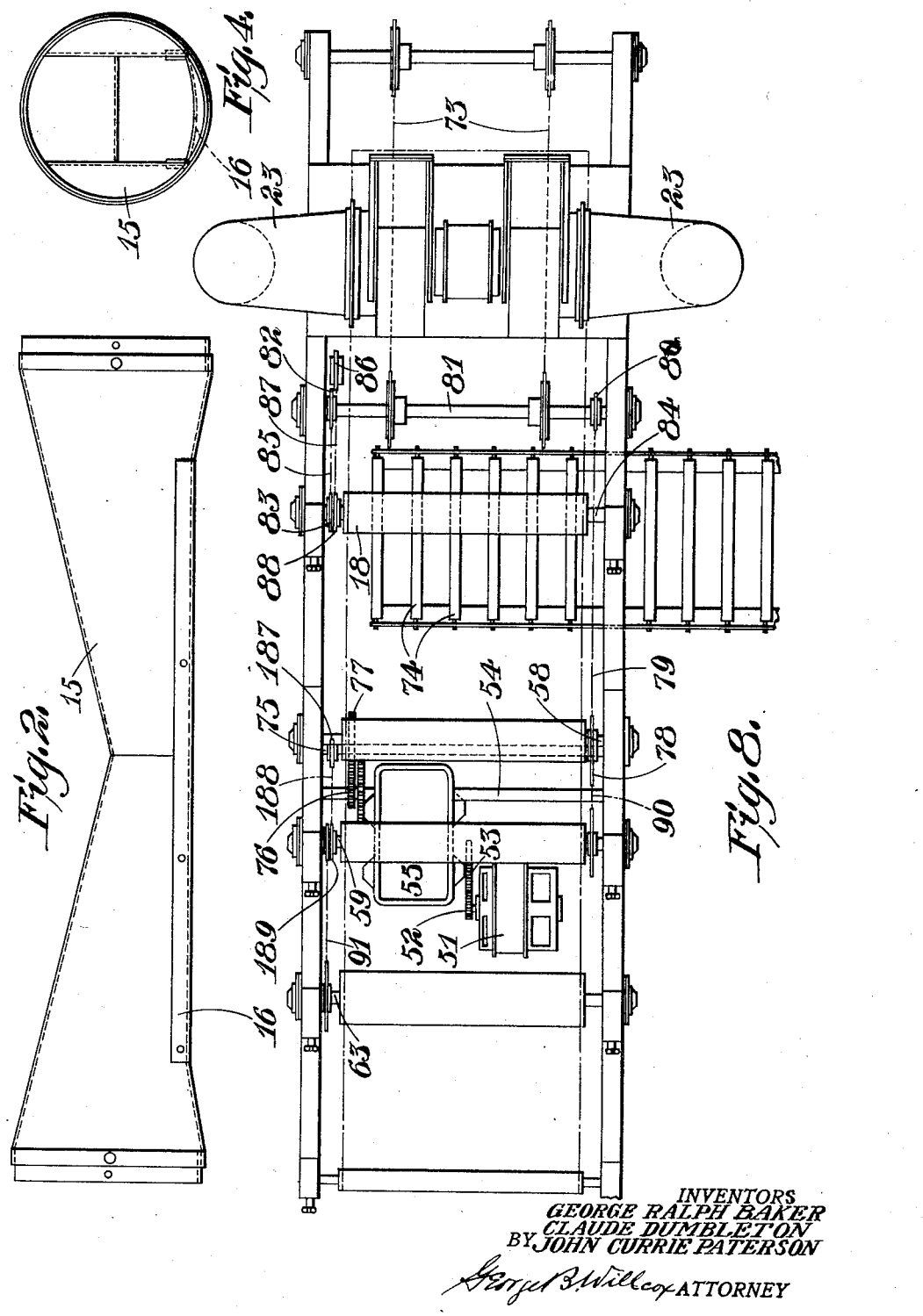

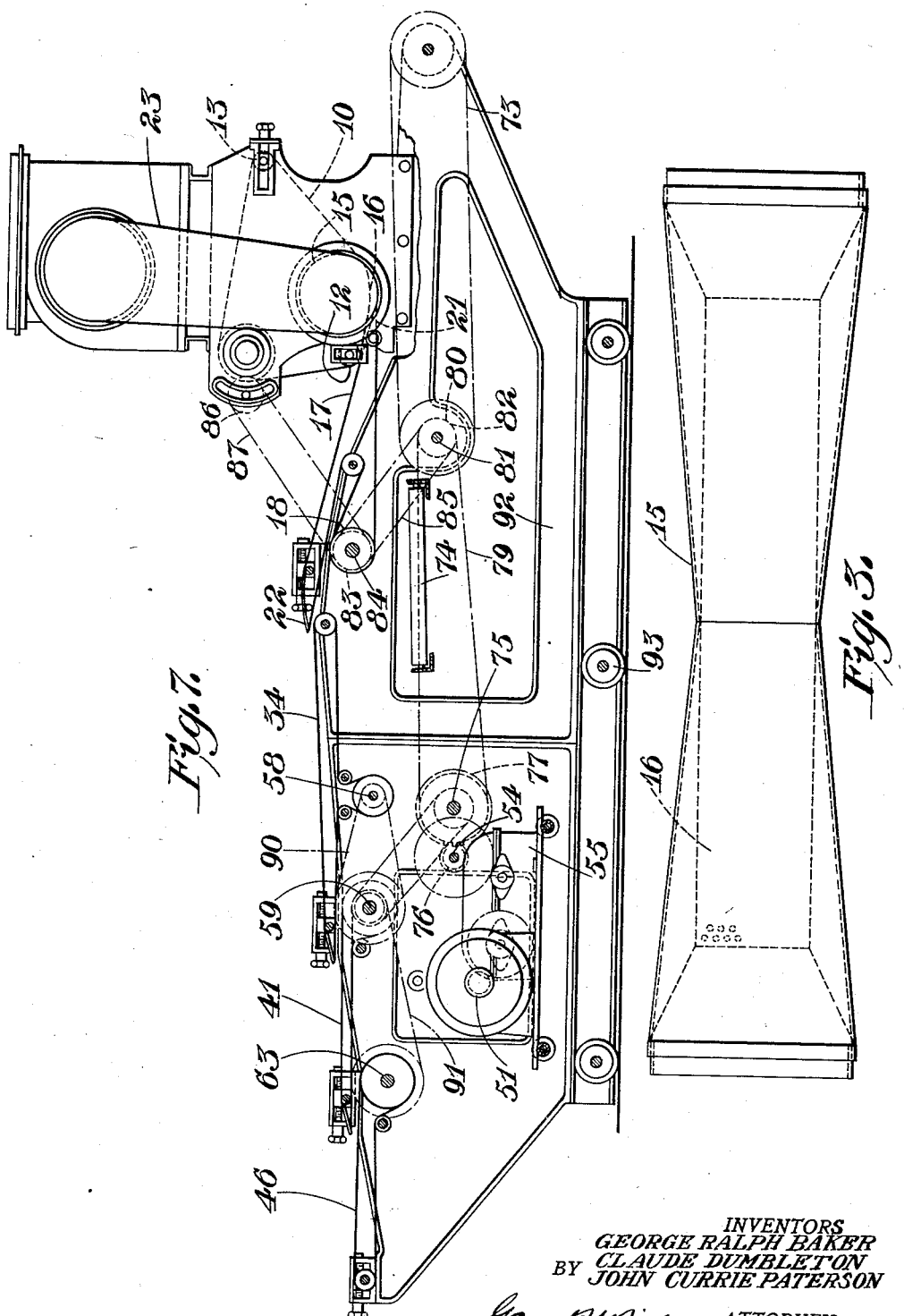

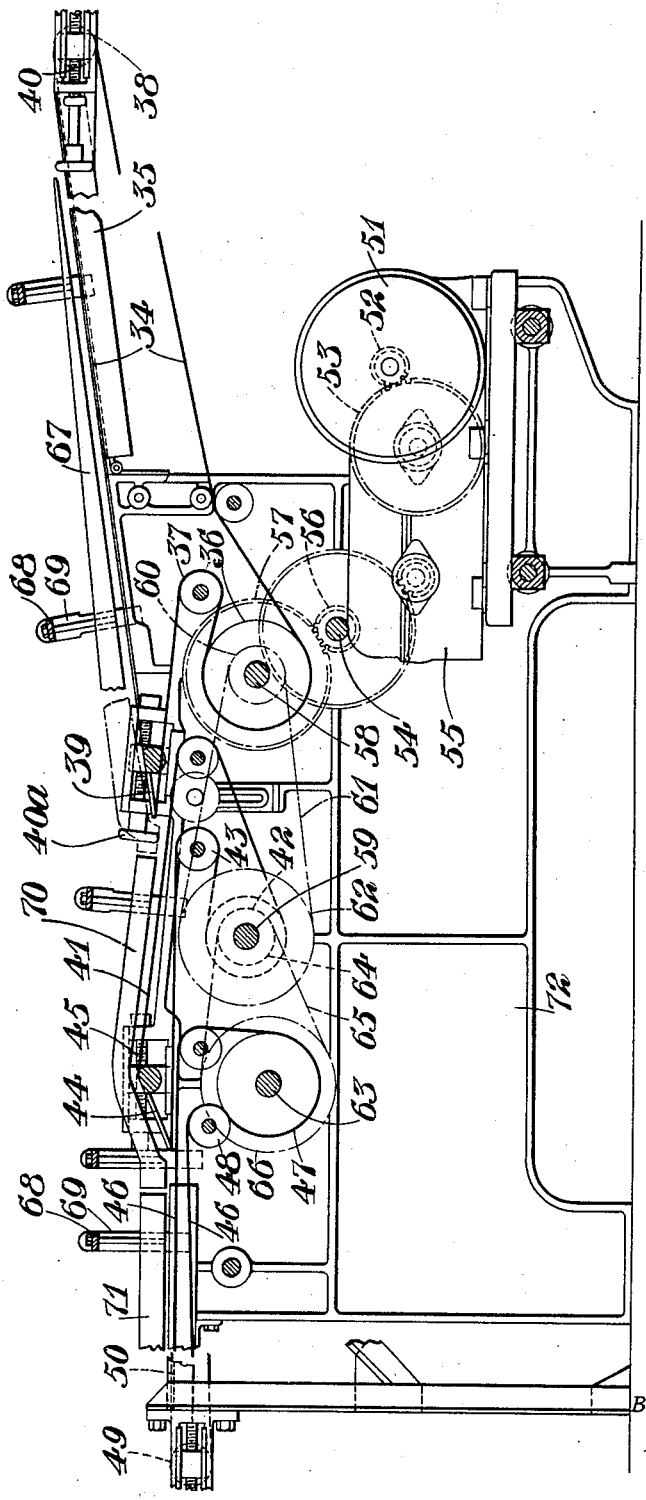

1,750,452

UNITED STATES PATENT OFFICE

GEORGE RALPH BAKER, CLAUDE DUMBLETON, AND JOHN CURRIE PATERSON, OF LONDON, ENGLAND, ASSIGNORS TO BAKER PERKINS COMPANY, INC., OF SAGINAW, MICHIGAN, A CORPORATION OF NEW YORK

UNLOADING AND STACKING MECHANISM FOR BISCUIT OVENS

Application filed June 13, 1929, Serial No. 370,660, and in Great Britain June 12, 1928.

This invention relates to the discharge of articles such as biscuits from conveyors and is especially applicable to conveyors employed in connection with continuous biscuit-baking ovens and plant.

An object of the invention is to provide improved means for discharging or transferring the biscuits from the oven conveyor whereby they may be delivered automatically to stacking or other collecting or packing means, thus providing substantially automatic operation from the initial introduction of the biscuit into the oven to the final delivery of the baked biscuit therefrom.

The invention consists in a method of conveying or discharging biscuits or like articles from trays or the like, comprising feeding the biscuits or articles beneath a suction device to elevate the biscuits or articles and cause their adherence to a traveling element or band associated with the suction device and removing the traveling element from the suction zone to effect delivery of the biscuits or articles.

The apparatus for conveying or discharging biscuits or like articles according to this invention includes a suction nozzle or chamber and an air pervious member adapted to travel across the chamber or mouth of the nozzle.

Preferably the air pervious element comprises a conveyor or band enclosing a space in which the suction nozzle or chamber is located, one lap of the band engaging a perforated surface of the nozzle and being arranged to separate from such surface whereby biscuits adhering to the conveyor are removed from the suction zone.

Further features of invention will be hereinafter described and defined in the claims.

In the accompanying drawings Fig. 1 is an elevation showing the cooler end of a biscuit oven with the suction discharge applied thereto.

Figs. 2, 3 and 4 are elevation, plan and end elevation of a suction nozzle.

Fig. 5 is a sectional elevation of a biscuit-stacking apparatus for use with a discharge device as shown in Fig. 1.

Fig. 7 is an elevation of a portable combined suction discharge device and biscuit stacking apparatus.

Figs. 8 and 9 are respectively plan and end elevation corresponding to Fig. 7.

Figure 6:
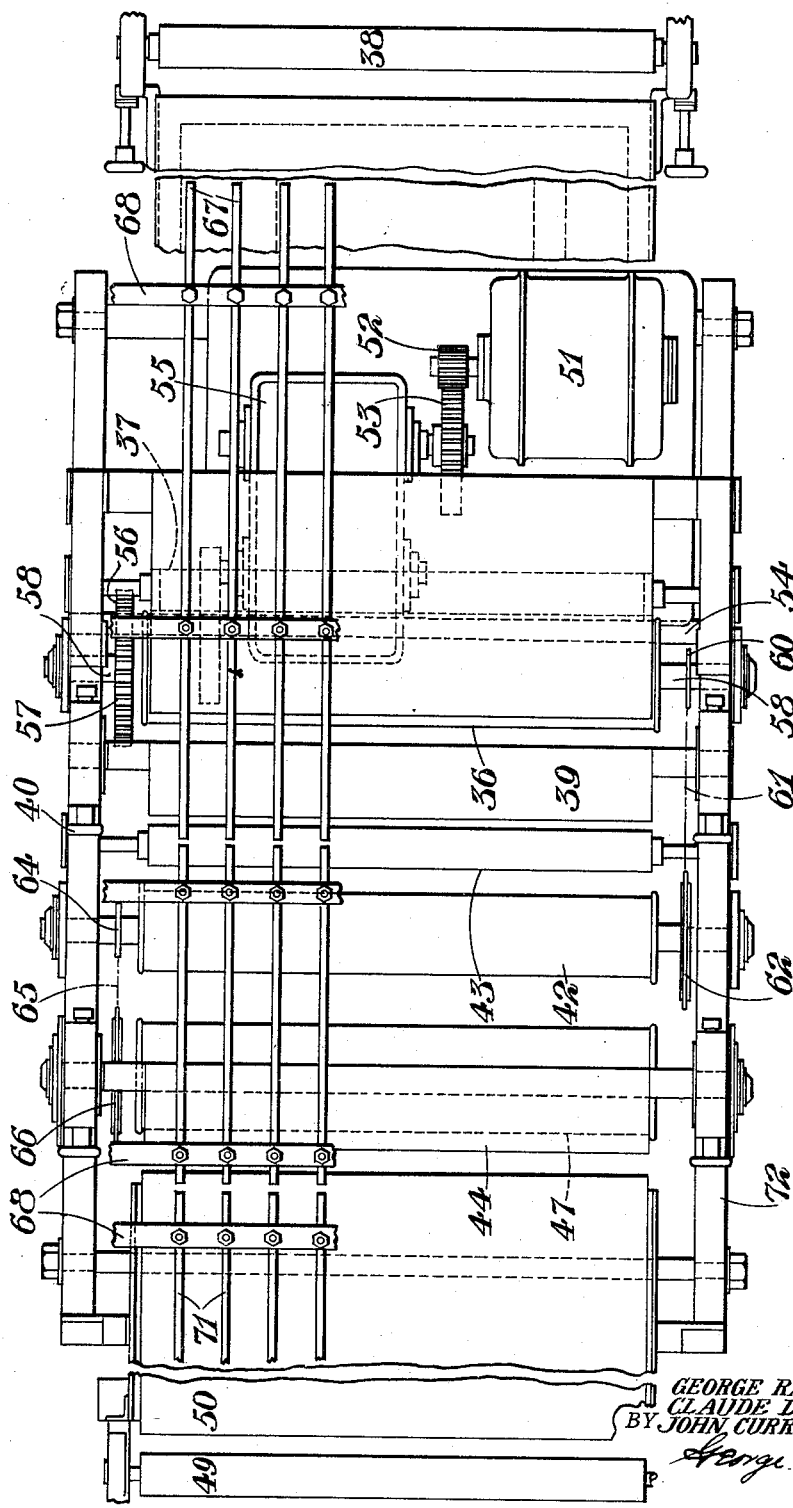
Fig. 6 is a plan corresponding to Fig. 5.
Figure 9:
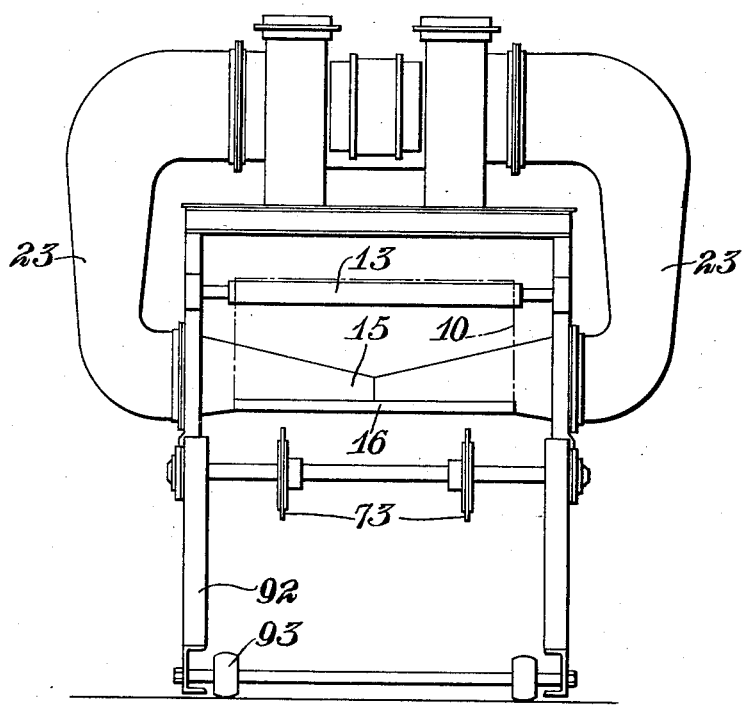

In carrying the invention into effect according to one convenient form (see Figs. 1 to 4), a transferring conveyor 10 formed of air-pervious material is mounted upon suitable driving and guiding or supporting rollers 11, 12, 13 so as to enclose a space, the lower lap being disposed at a suitable height above the tray-conveyor 14 and at an appropriate position in its course.

Within the space enclosed by the transferring conveyor band a suction box or nozzle 15, the lower wall 16 of which is formed by a perforated plate, is mounted. The suction box is disposed in such a position with regard to the lower rollers 12, and 13 of the transferring conveyor that the lower lap of the latter is held in contact with the perforated suction plate. The forward end of the suction plate may be inclined upwardly and overlie a delivery conveyor band 17 which is mounted above the tray-conveyor 14 and is adapted to receive the biscuits from the transferring conveyor 10 and deliver them to a suitable stacking or packing device as hereinafter described.

The delivery band 17 comprises a continuous band mounted upon suitable rollers 18 and 19 and a supporting plate 20, the band being driven so that its upper lap moves in the direction of the lower lap of the transferring conveyor. The ends of the delivery band 17 extend over adjustable knife edge members 21 and 22.

The ends of the suction nozzle 15 are connected by conduits 23 to any suitable suction-producing means, such as a fan or the like.

The transferring conveyor 10 and delivery conveyor 17 are preferably driven from a moving part of the oven conveyor 14. Preferably the driving roller 18 of the delivery conveyor 17 is driven by chain and sprocket gearing 24, 25, 26 from the driving wheel 27 of the oven conveyor. On the spindle of the roller 18 another chain wheel 28 is mounted which drives, through the chain 29, a sprocket wheel 30 carried by a spindle 31. The latter is suitably geared to a roller 11 that drives the transferring band 10. The spindle 31 is adjustably mounted in a quadrant slot 32 for adjusting the tension of drive chain 29.

The arrangement is such that when the biscuits arrive beneath the suction nozzle 15 they are lifted into contact with the air-pervious transferring band 10 and are retained in such position by the suction until by the relative movement of the transferring conveyor band with regard to the wall 16 of the suction nozzle they lie beyond the edge of the wall or perforated plate and are separated therefrom when the biscuits will be released and fall onto the delivery band 17 for transference to suitable stacking or other means.

The transferring and delivery bands are provided with tension adjusting means 33 and 19 respectively.

It may be desirable, under certain conditions, to transfer the biscuits to a position at the rear of the suction box in which case instead of the lower lap of the transferring conveyor band 10 moving in the direction of the tray-conveyor it will be driven in the reverse direction, the delivery band 17 being disposed at the rear of the latter and receiving the biscuits at such position.

My improved apparatus for receiving the biscuits from the delivery band 17 and arranging them in stacked relation is shown in Figs. 5 and 6. In the plan (Fig. 6) certain of the parts are omitted for clearness.

This stacking apparatus comprises a receiving conveyor band 34, one end of which is carried on a hinged table 35, whereby the receiving end of the conveyor is adapted to be positioned beneath the delivery end of conveyor 17 (Fig. 1). The conveyor band 34 is mounted upon a driving roller 36, supporting or guiding rollers 37 and 38, and an adjustable knife edge 39.

The roller 38 and knife edge 39 are provided with tighteners 40, 40ª whereby the tension of the conveyor band 34 may be suitably adjusted.

Biscuits from the conveyor 34 are delivered to a second conveyor 41, the receiving end of which is disposed below the knife edge 39 of the conveyor 34. The conveyor 41 is provided with a driving roll 42 and supporting or guiding rollers 43, and an adjustable delivery knife edge 44. The tension of the conveyor 41 may be adjusted by altering the position of the knife edge 44 by means of the screw 45.

The delivery end of conveyor 41 is inclined downwardly at a sufficiently steep angle to cause the already overlapping biscuits on it to leave its discharging knife edge 44 in such a manner that the lower edges of the biscuits will drop onto a final conveyor 46, one after the other, the biscuits now being stacked on edge in approximately vertical position, after the manner of books on a shelf.

The conveyor 46 is provided with a driving roller 47, and guiding or supporting rollers 48 and 49, the roller 49 being adjustably mounted so that the tension of the conveyor band 46 may be varied as desired. The upper run of conveyor 46, from which biscuits in stacked relation may be removed by hand, is preferably supported by a table or plate 50.

The conveyor bands 34, 41 and 46 are driven at progressively slower speeds in such a manner that the biscuits being delivered from the conveyor 34 to the conveyor 41 will be received thereon in overlapping relation while the biscuits delivered from the conveyor 41 to the conveyor 46 will arrive in approximately vertical position.

The driving of the various conveyors is effected in any convenient manner. According to the arrangement shown, a motor 51 drives the shaft 54 through the gearing 52, 53 and change speed gear 55. The shaft 54 is provided with a gear wheel 56 meshing with a gear wheel 57 mounted upon the spindle 58 of the driving roller 36 of the conveyor band 34.

The spindle 58 is geared to the spindle 59 of the conveyor 41 by chain and sprocket gearing 60, 61, 62 whereby a reduction in speed of the conveyor 41 is provided.

The spindle 59 of the conveyor 41 is similarly geared to the spindle 63 of the conveyor 46 by chain and sprocket gear 64, 65, 66 so that the conveyor 46 is driven at a reduced speed relatively to the conveyor 41. Any other suitable gearing for driving the conveyors may be provided.

In order to maintain the biscuits in alignment in their various rows, a series of parallel slats may be mounted above the conveyors. Thus, the conveyor 34 may be provided with slats 67 carried by cross bars 68, mounted upon the brackets 69. The slats 67 may be tapered as shown in Fig. 5 toward the end where the biscuits will be lying flat on the conveyor. Similarly mounted slats 70 and 71 are provided in connection with the conveyors 41 and 46, these slats, however, being of full width as indicated. The various parts are mounted upon a suitable framework 72.

According to a modified form of apparatus suitable in connection with a biscuit baking oven where the trays are removed from the oven, the biscuit discharge device and the biscuit stacking apparatus may be combined in a single apparatus comprising a self-contained portable machine.

Referring to Figs. 7 and 8 the biscuit trays are adapted to be mounted upon a conveyor 73 by which they are moved beneath the vacuum discharge nozzle 15. After the biscuits are removed from the trays, the latter are delivered to a laterally disposed conveyor 74 comprising a series of rollers by which the empty trays are delivered by gravity to a suitable discharge position.

The biscuits removed from the trays by the transferring conveyor 10 are delivered onto the delivery band 17 from which they are delivered to the stacking conveyors 34, 41, and 46. The various elements of the discharge device and the stacking apparatus are arranged similarly to those described in the previous modification, the only difference being that in the combined apparatus, the parts are all preferably driven from the same motor which is mounted upon the framework of the apparatus. Thus, referring to Figs. 7 and 8, the motor 51 transmits motion to the shaft 54 through reduction gearing arranged as shown in Fig. 5. The shaft 54 is geared to a shaft 75 by gearing 76, 77. The shaft 75, through chain and sprocket gear 78, 79, 80 drives the spindle 81 of the tray conveyor 73.

The spindle 81 carries a second chain wheel 82 which is geared to a sprocket chain wheel 83 on the spindle 84 of the driving wheel 18 of the delivery band 17 by a chain 85.

The drive for the transferring band 10 is effected by chain and sprocket gearing 86, 87, 88 from the spindle 84.

The drive for the stacking conveyors is effected in the following manner. The driving spindle 59 of the conveyor 41 is driven from the shaft 75 by chain and sprocket gear 187, 188, 189 while the driving spindles 58 and 63 respectively of the conveyors 34 and 46 are driven by chains 90 and 91 through suitable sizes of chain wheels on the respective spindles so that the desired relative speeds of the conveyors 34, 41, 46 are obtained.

The apparatus is mounted upon a framework 92 carried by wheels 93 whereby it may be moved up to the oven from which the biscuit trays are being removed. The stacking conveyors will be provided with aligning slats as shown in the previous modification.

Having thus described our invention, what we claim and desire to secure by Letters Patent is:

1. In a device for removing biscuits from the trays of a traveling conveyor and for stacking them, the combination of a suction nozzle disposed crosswise the direction of travel of the conveyor and spanning the width thereof, a perforate bottom for said nozzle, an air-pervious traveling band arranged to pass across the perforate bottom in the direction of the length of the conveyor and in close proximity to the biscuits on the trays, three conveyors arranged in succession and driven respectively at decreasing speeds, the first conveyor adapted to receive and carry material delivered to it by said traveling band, the receiving end of the second conveyor underlying the delivery end of the first conveyor, the receiving end of the third conveyor underlying the delivery end of the second, said second conveyor formed near its delivery end with a relatively steep declination, and means for driving said conveyors and said air-pervious band, for the purposes set forth.

2. In a device for removing biscuits from the trays of a traveling conveyor and for stacking them, the combination of a suction nozzle, a perforate bottom for said nozzle, an air-pervious traveling band arranged to pass across the perforate bottom in close proximity to the biscuits on the trays, a plurality of conveyors arranged in series, each successive conveyor driven at less speed than the preceding one, the first conveyor of the series adapted to receive and carry material delivered to it by said traveling band, the receiving end of each conveyor underlying the delivery end of the next preceding conveyor, the next to the last conveyor of the series formed near its delivery end with a relatively steep declination, and means for driving said conveyors and said air-pervious band, for the purposes set forth.

3. In a device for removing biscuits from the trays of a traveling conveyor and for stacking them, the combination of a suction nozzle, a perforate bottom for said nozzle, an air-pervious traveling band arranged to pass across the perforate bottom in close proximity to the biscuits on the trays, a plurality of conveyors arranged in series, each successive conveyor driven at less speed than the preceding one, the first conveyor of the series adapted to receive and carry material delivered to it by said traveling band, the receiving end of each conveyor underlying the delivery end of the next preceding conveyor, and means for driving said conveyors and said air-pervious band, for the purposes set forth.

In testimony whereof, we affix our signatures.

GEORGE RALPH BAKER.
CLAUDE DUMBLETON.
JOHN CURRIE PATERSON.